United States Patent [19]
Chuang et al.

[11] Patent Number: 5,936,780
[45] Date of Patent: Aug. 10, 1999

[54] PROJECTION ZOOM LENS HAVING A LONG BACK FOCAL LENGTH

[75] Inventors: Fu-Ming Chuang, Chutung; Lu-Hwa Chen, Hsinchu Hsien, both of Taiwan

[73] Assignee: Industrial Technology Research Institute, Hsinchu, Taiwan

[21] Appl. No.: 09/063,209

[22] Filed: Apr. 20, 1998

[51] Int. Cl.⁶ .................................................. G02B 15/14
[52] U.S. Cl. ........................ 359/691; 359/649; 359/754
[58] Field of Search ................................... 359/676, 683, 359/691, 754, 649

[56] References Cited

U.S. PATENT DOCUMENTS 4,190,323  2/1980  Ogawa et al. ............................ 359/691

FOREIGN PATENT DOCUMENTS 6-130295  5/1994  Japan .

Primary Examiner—Scott J. Sugarman
Attorney, Agent, or Firm—Harness, Dickey & Pierce, P.L.C.

[57] ABSTRACT

A projection zoom lens having a long back focal length is provided which can produce excellent image quality. The projection zoom lens comprises: a front lens group including a first lens that is a convex lens, a second lens and a third lens, both of which are meniscus negative lens having a convex surface that is directed toward the object side, a fourth lens that is a meniscus lens having a surface which has a larger radius of curvature toward the image side; and a rear lens group including a fifth lens that is a plano-convex lens having a plane surface directed toward the object side, a sixth lens that is a biconvex lens, a seventh lens that is a meniscus negative lens, forming a doublet with the sixth lens, having a surface that has a larger radius of curvature directed toward the image side, an eighth lens that is a meniscus negative lens, a ninth lens that is a plano-convex lens, and a tenth lens that is a biconvex lens; wherein the projection zoom lens conforms to the following conditions:

$$1.2 \le \frac{|f_A|}{f_W} \le 1.5$$

$$V_3 \cdot N_3 \ge 90$$

$$V_6 - V_7 > 30$$

$$\frac{|f_A + f_B|}{f_B} \le 0.2$$

where, $f_A$ is the focal length of the front lens group, $f_B$ is the focal length of the rear lens group, $f_W$ is the focal length of the projection zoom lens at the wide-angle side, $N_3$ is the refractive index of the third lens, and $V_3$, $V_6$ and $V_7$ are the Abbe numbers of the third lens, the sixth lens and the seventh lens, respectively.

6 Claims, 10 Drawing Sheets

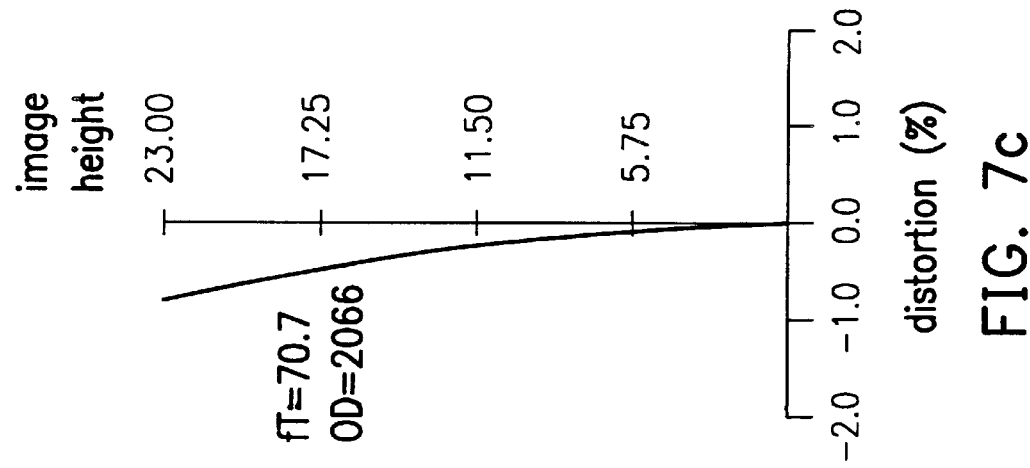
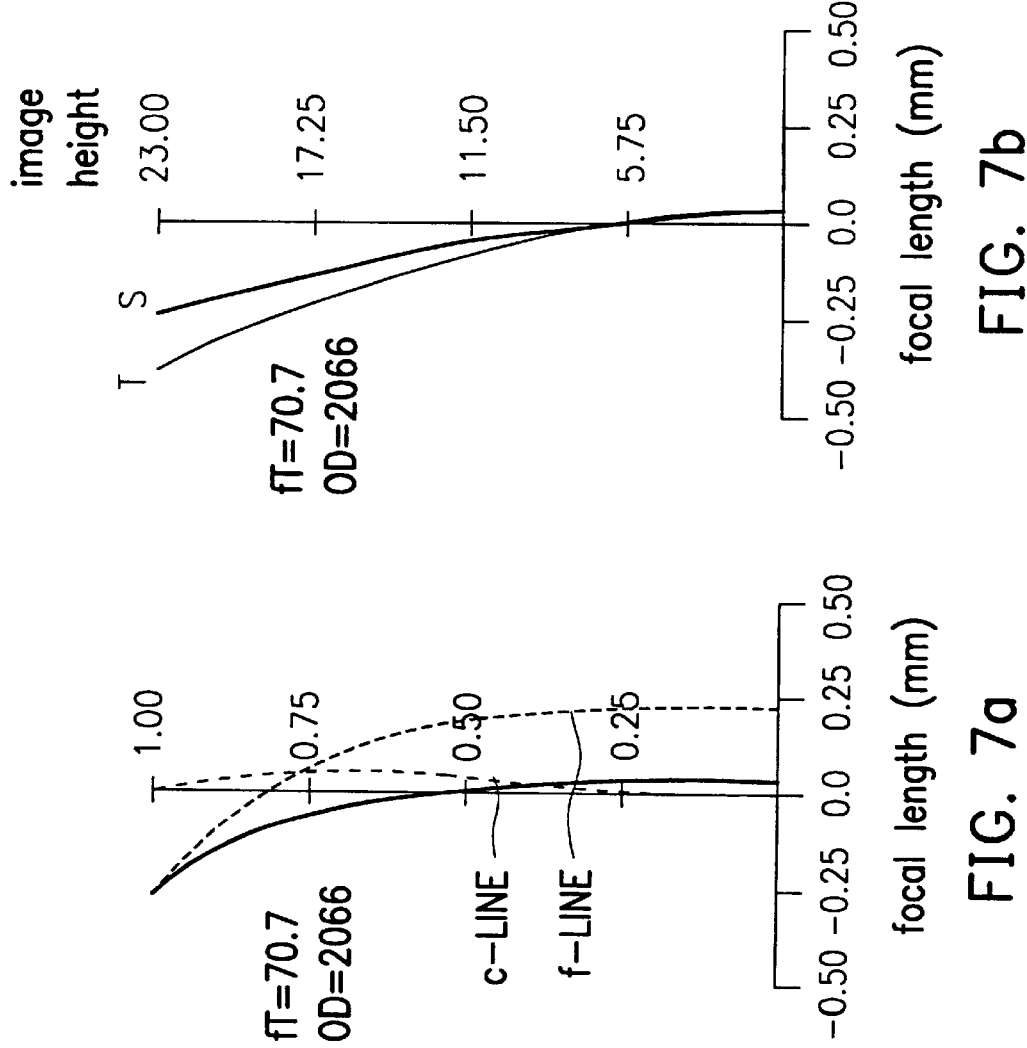
FIG. 7c
FIG. 7b
FIG. 7a

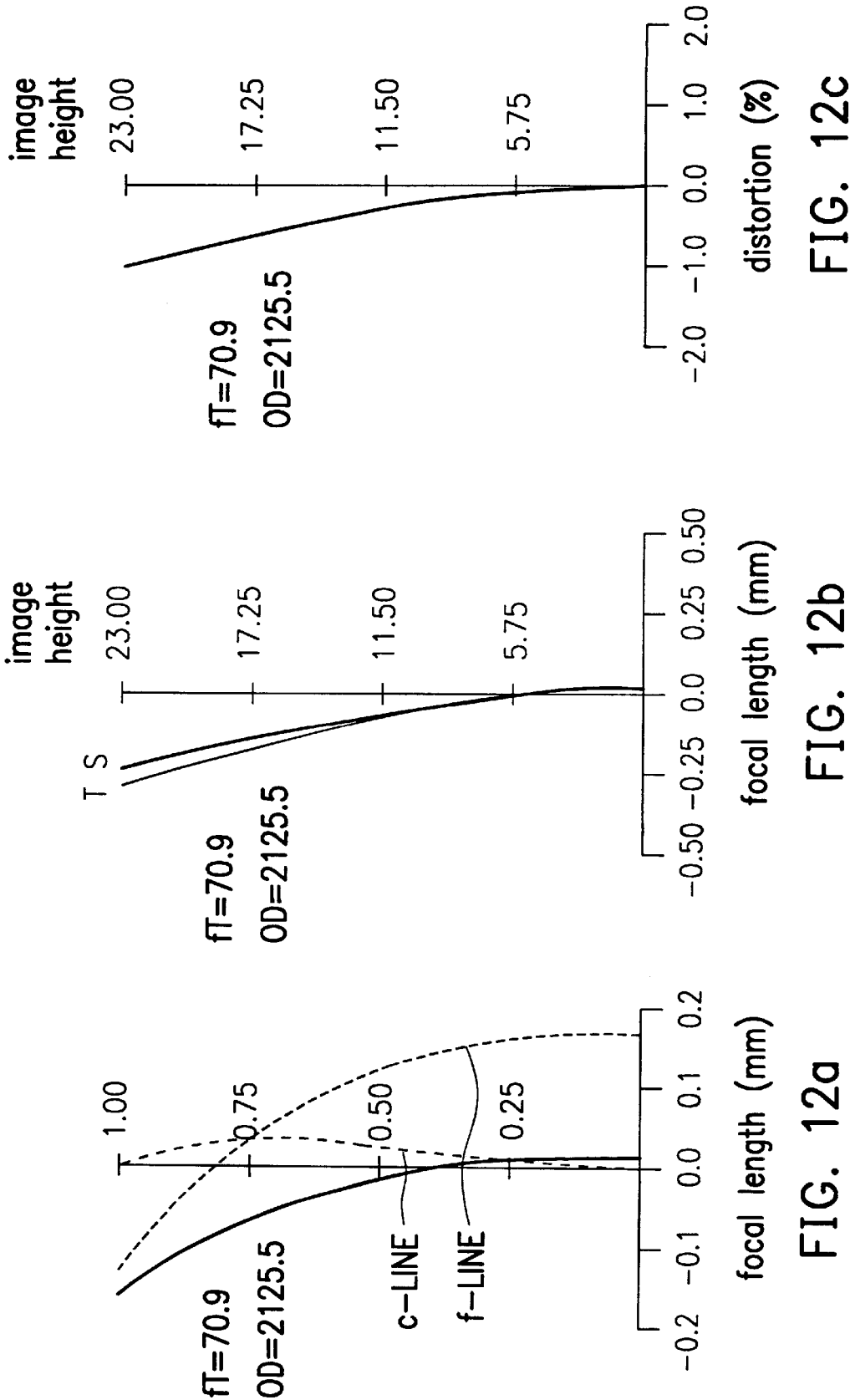

PROJECTION ZOOM LENS HAVING A LONG BACK FOCAL LENGTH

BACKGROUND OF THE INVENTION

1. Field of the invention

The present invention relates to a zoom lens, especially to a projection zoom lens employed in a projection system, and more particularly relates to a zoom lens having a long back focal length.

2. Description of prior art

Conventionally, a zoom lens is designed for use in photography, therefore its back working distance, i.e., back focal length, is normally short but can meet the requirements of cameras. However, a conventional zoom lens cannot be applied to a projection device due to its short back focal length. For instance, referring to FIG. 1 of U.S. Pat. No. 4,190,323 a zoom lens is disclosed including a first lens group 10 and a second lens group 20, which has a viewing angle greater than 76° and a zoom ratio of more than 2.3, but has a short back focal length.

A projection device, such as an LCD projector, requires a high resolution projection zoom lens due to the resolution required by LCD. Moreover, because of beam splitting in the device, the projection lens needs a long back working distance. Therefore, some zoom lens systems have been designed for use in projection devices in the prior art.

Referring to FIG. 2, Japanese Patent Laid-Open 6-130295 discloses a projection zoom lens which includes a first lens group 30 having a negative focal length and a second lens group 40 having a positive focal length. In such a projection zoom lens, the spherical aberration is within 0.5 mm, the astigmatism is within 0.5 mm, and the distortion is within 5%. However, the lens is provided with a back focal length longer than 99 cm. Although the back focal length can meet the requirement of a projection lens, the image quality is not desirable.

As described above, projection zoom lenses in the prior art are not suitable for use as projection lenses because the back focal length is too short or the image quality is not acceptable.

SUMMARY OF THE INVENTION

Accordingly, to improve on the drawbacks of the prior art, the object of the present invention is to provide a projection zoom lens having a long back focal length which can provide good image quality. In other words, the projection zoom lens has high image resolution and small distortion throughout the entire field.

BRIEF DESCRIPTION OF THE DRAWINGS

The following detailed description, given by way of example and not intended to limit the invention solely to the embodiments described herein, will best be understood in conjunction with the accompanying drawings in which:

FIG. 7a is a diagram illustrating the spherical aberration for the lens shown in FIG. 3, in which the object distance is 2 meters on the telephoto side;

FIG. 7b is a diagram illustrating the astigmatism for the lens shown in FIG. 3, in which the object distance is 2 meters on the telephoto side;

FIG. 7c is a diagram illustrating the distortion for the lens shown in FIG. 3, in which the object distance is 2 meters on the telephoto side;

FIG. 12a is a diagram illustrating the spherical aberration for the lens shown in FIG. 8, in which the object distance is 2 meters on the telephoto side;

FIG. 12b is a diagram illustrating the astigmatism for the lens shown in FIG. 8, in which the object distance is 2 meters on the telephoto side; and FIG. 12c is a diagram illustrating the distortion for the lens shown in FIG. 8, in which the object distance is 2 meters on the telephoto side.

DETAILED DESCRIPTION OF THE PREFERRED EMBODIMENTS

Figure 1:
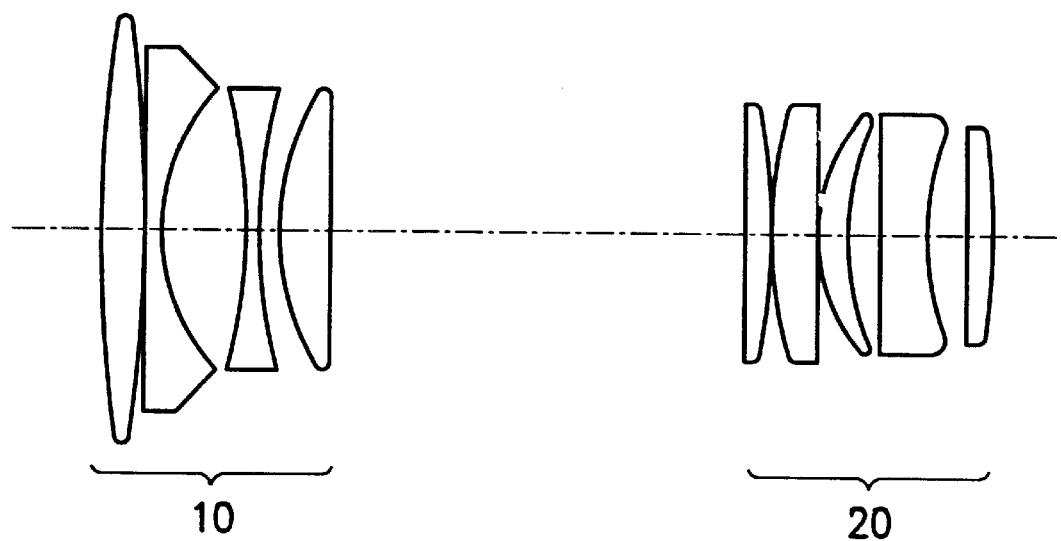
FIG. 1 is a diagram illustrating the structure of a conventional projection zoom lens.
Figure 2:
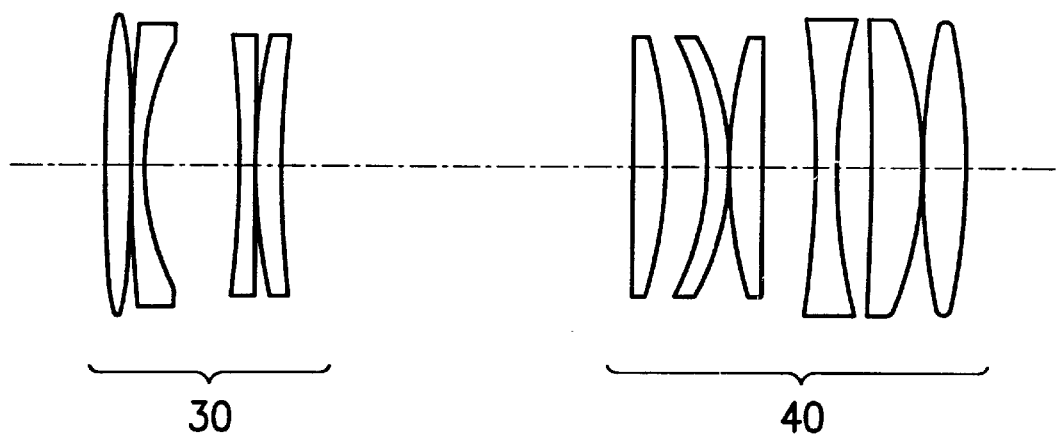
FIG. 2 is a diagram illustrating the structure of another conventional projection zoom lens.
Figure 3:
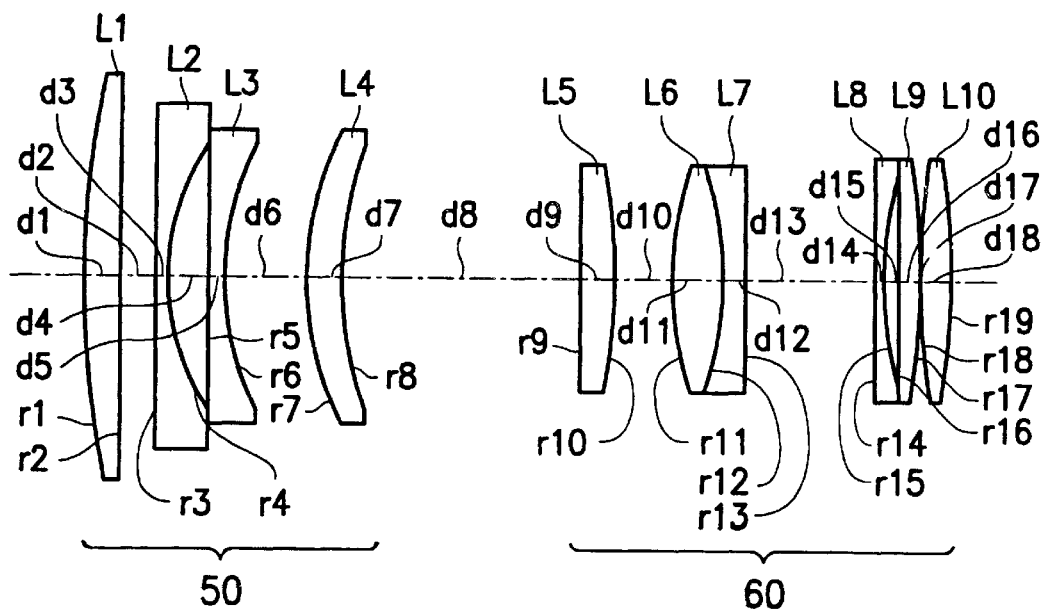
FIG. 3 is a diagram illustrating the structure of a projection zoom lens having a long back focal length according to one embodiment of this invention.

Referring to FIG. 3, according to one embodiment of the present invention, the projection zoom lens having a long back focal length includes a front lens group 50 and a rear lens group 60. The front lens group 50 includes: a first lens L1 that is a convex lens; a second lens L2 and a third lens L3, both of which are meniscus negative lenses, having a convex surface which is directed toward the object side; and a fourth lens L4 that is a meniscus positive lens having a surface which has a larger radius of curvature directed toward the image side. The rear lens group 60 includes a fifth lens L5 that is a plano-convex lens having a plane surface which is directed toward the object side; a sixth lens L6 that is a biconvex lens; a seventh lens L7 that is a meniscus negative lens, which forms a doublet with the sixth lens L6 having a surface which has a larger radius of curvature directed toward the image side; an eighth lens L8 that is a meniscus positive lens having a surface which has a larger radius of curvature directed toward the object side; a ninth lens L9 that is a plano-convex lens having a plane surface which is directed toward the object side; and a tenth lens L10 that is a biconvex lens. The radius of curvature, the thickness of each lens or the distance between adjacent lenses, the refractive index at the d-line and Abbe number are given in Table 1, wherein the f-number is in a range of 3.6 to 4.2, the focal length is in a range of 51.7 to 71.9 mm, and the half viewing angle is in a range of 23.6° to 17.7°.

TABLE 1

| Surface No. | Radius of Curvature(mm) | Thickness or Distance(mm) | Refractive index | Abbe Number |
|---|---|---|---|---|
| 0 | ∞ | 980~10500 | | |
| 1 | 94.50 | 6.76 | 1.51680 | 64.17 |
| 2 | ∞ | 4.09 | | |
| 3 | 181.17 | 2.11 | 1.48749 | 70.41 |
| 4 | 31.95 | 7.31 | | |
| 5 | 335.06 | 1.60 | 1.62041 | 60.30 |
| 6 | 39.02 | 20.50 | | |
| 7 | 43.80 | 5.1 | 1.76182 | 26.54 |
| 8 | 55.04 | 38.90~15.1 | | |
| 9 | ∞ | 4.41 | 1.67270 | 32.16 |
| 10 | −131.61 | 8.98 | | |
| 11 | 52.04 | 7.53 | 1.48749 | 70.41 |
| 12 | −49.72 | 4.00 | 1.74949 | 35.03 |
| 13 | −536.70 | 19.58 | | |
| 14 | 370.99 | 1.60 | 1.68893 | 31.15 |
| 15 | 64.84 | 2.19 | | |
| 16 | ∞ | 3.51 | 1.62041 | 60.30 |
| 17 | −78.78 | 0.24 | | |
| 18 | 278.46 | 3.565 | 1.58913 | 61.23 |
| 19 | −114.98 | | | |

Figure 8:
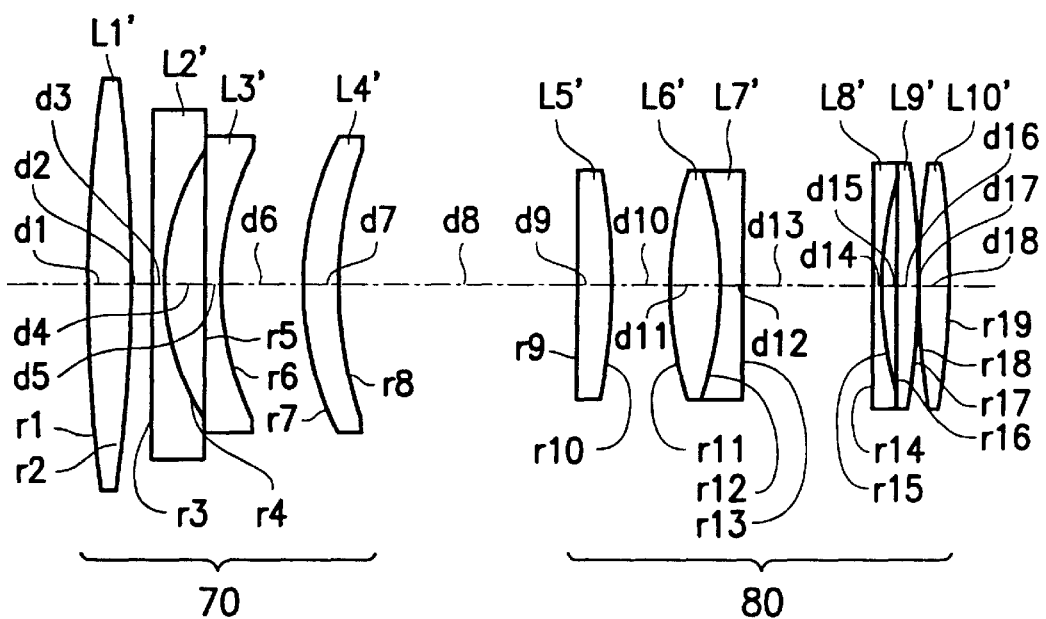
FIG. 8 is a diagram illustrating the structure of a projection zoom lens having a long back focal length according to one embodiment of this invention.

Referring to FIG. 8, according to another embodiment of the present invention, like the previous embodiment, the projection zoom lens having a long back focal length also includes a front lens group 70 and a rear lens group 80. The front lens group 70 includes: a first lens L1' that is a biconvex lens; a second lens L2' and a third lens L3', both of which are meniscus negative lenses, having a convex surface which is directed toward the object side; and a fourth lens L4' that is a meniscus positive lens having a surface which has a larger radius of curvature directed toward the image side. The rear lens group 80 includes a fifth lens L5' that is a plano-convex lens having a surface which has a larger radius of curvature directed toward the object side; a sixth lens L6' that is a biconvex lens; a seventh lens L7' that is a meniscus negative lens which forms a doublet with the sixth lens L6', having a surface which has a larger radius of curvature directed toward the image side; an eighth lens L8' that is a meniscus negative lens with a surface that has a larger radius of curvature directed toward the object side; a ninth lens L9' that is a plano-convex lens having a plane surface which is directed toward the object side; and a tenth lens L10' that is a biconvex lens. The parameters of the projection zoom lens including the radius of curvature, the thickness of each lens or the distance between adjacent lenses, the refractive index at the d-line and Abbe number are given in Table 1, wherein the f-number is in a range of 3.6 to 4.2, the focal length is in a range of 51.8 to 71.8 mm, and the half viewing angle is in a range of 23.6° to 17.7°.

TABLE 2

| Surface No. | Radius of Curvature(mm) | Thickness or Distance(mm) | Refractive index | Abbe Number |
|---|---|---|---|---|
| 0 | ∞ | 980~10500 | | |
| 1 | 156.23 | 7.18 | 1.51680 | 64.17 |
| 2 | −732.57 | 12.35 | | |
| 3 | 463.16 | 3.60 | 1.51680 | 64.17 |
| 4 | 35.56 | 6.06 | | |
| 5 | 166.44 | 2.90 | 1.62041 | 60.30 |
| 6 | 39.16 | 18.10 | | |
| 7 | 43.74 | 7.55 | 1.76182 | 26.54 |
| 8 | 56.42 | 39.57~15.03 | | |
| 9 | ∞ | 6.77 | 1.67270 | 32.16 |
| 10 | −159.13 | 7.30 | | |
| 11 | 56.13 | 10.34 | 1.48749 | 70.41 |
| 12 | −45.11 | 6.03 | 1.74949 | 35.03 |
| 13 | −284.00 | 17.50 | | |
| 14 | 297.80 | 2.33 | 1.68893 | 31.15 |
| 15 | 69.93 | 1.93 | | |
| 16 | ∞ | 3.38 | 1.62041 | 60.30 |
| 17 | −80.30 | 0.22 | | |
| 18 | 242.87 | 3.85 | 1.58913 | 61.23 |
| 19 | −123.50 | | | |

In order to achieve the object of this invention, the projection zoom lenses in the previous embodiments must meet the following requirements to provide a long back focal length and excellent image quality:

$$1.2 \leq \frac{|f_A|}{f_W} \leq 1.5 \quad (1)$$

$$V_3 \cdot N_3 \geq 90 \quad (2)$$

$$V_6 - V_7 > 30 \quad (3)$$

$$\frac{|f_A + f_B|}{f_B} \leq 0.2 \quad (4)$$

wherein: $f_A$ is the focal length of the front lens group; $f_B$ is the focal length of the rear lens group; $f_W$ is the focal length of the projection zoom lens at the wide angle side; $N_3$ is the refractive index of the third lens; $V_3$ is the Abbe number of the third lens; $V_6$ is the Abbe number of the sixth lens; and $V_7$, is the Abbe number of the seventh lens.

Condition (1) pertains to the relation of the total length and the back focal length of the projection zoom lens system. The total length is increased, so correcting aberrations becomes more difficult if $$\frac{|f_A|}{f_W}$$

is less than 1.2. On the other hand, if the total length is decreased, correction for aberrations becomes easier, but the back focal length is shortened if $$\frac{|f_A|}{f_W}$$

is larger than 1.5.

In condition (2), $V_3 \cdot N_3 \geq 90$ is required. The paraxial chromatic aberration, the lateral chromatic aberration and astigmatism will largely vary while the zoom lens system is displaced from the wide-angle position to the telephoto position if the $V_3 \cdot N_3$ is less than 90. This makes it difficult to correct these aberrations with good balance.

Condition (3) is the condition that should be satisfied by the Abbe numbers of the positive and negative lenses of the cemented doublet lens L6 and L7 in order to bring about the achromatization of the doublet. If achromatization is brought about beyond the range of this condition, other aberrations will be difficult to correct.

Condition (4) is for controlling the variation of the Petzval Curvature. If $(f_A+f_B)>0$, then $f_A<-0.8f_B$. The absolute value of Petzval curvature of the front lens group is increased from a normal value. In the other way, if $(f_A+f_B)<0$, then $f_A>-1.2f_B$. The absolute value of Petzval curvature of the front lens group is decreased from the normal value. Each of the two conditions may cause an increase of total Petzval curvature and aberration unbalance.

Figure 4C:
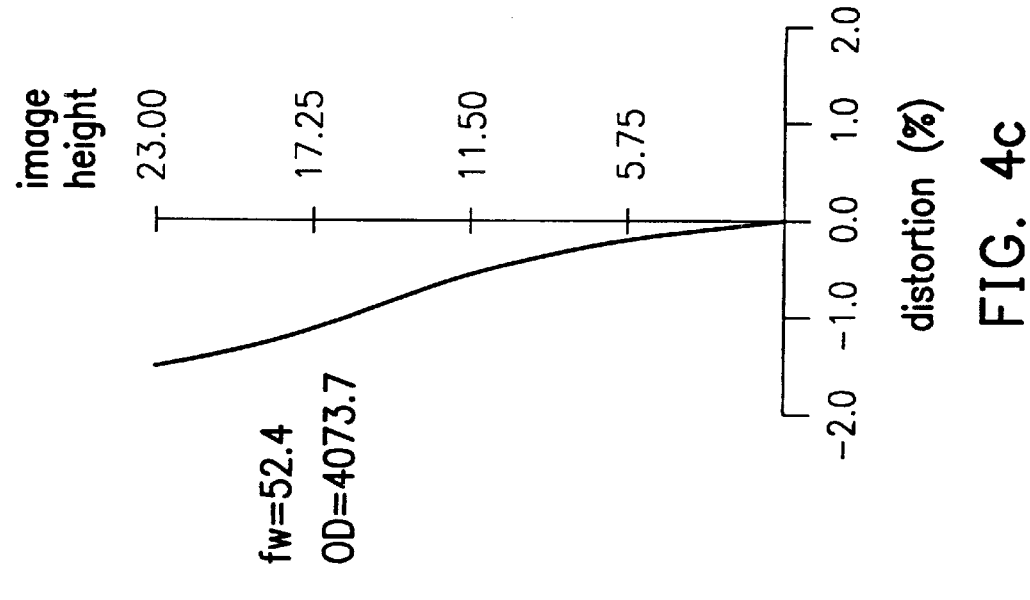
FIG. 4c is a diagram illustrating the distortion for the lens shown in FIG. 3, in which the object distance is 4 meters on the wide angle side.
Figure 4B:
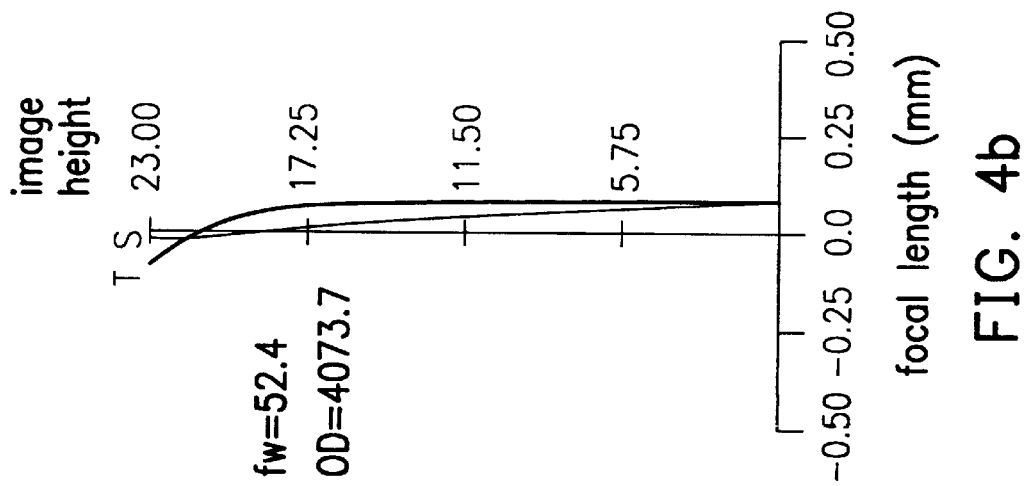
FIG. 4b is a diagram illustrating the astigmatism for the lens shown in FIG. 3, in which the object distance is 4 meters on the wide angle side.
Figure 4A:
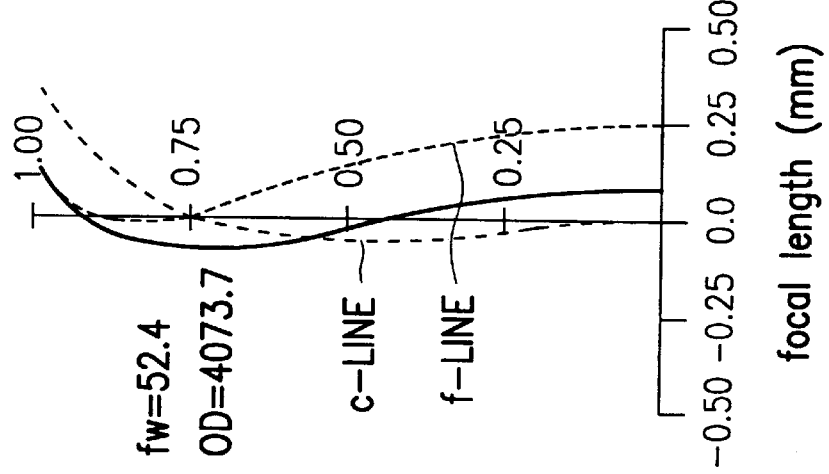
FIG. 4a is a diagram illustrating the spherical aberration for the lens shown in FIG. 3, in which the object distance is 4 meters on the wide angle side.
Figure 5C:
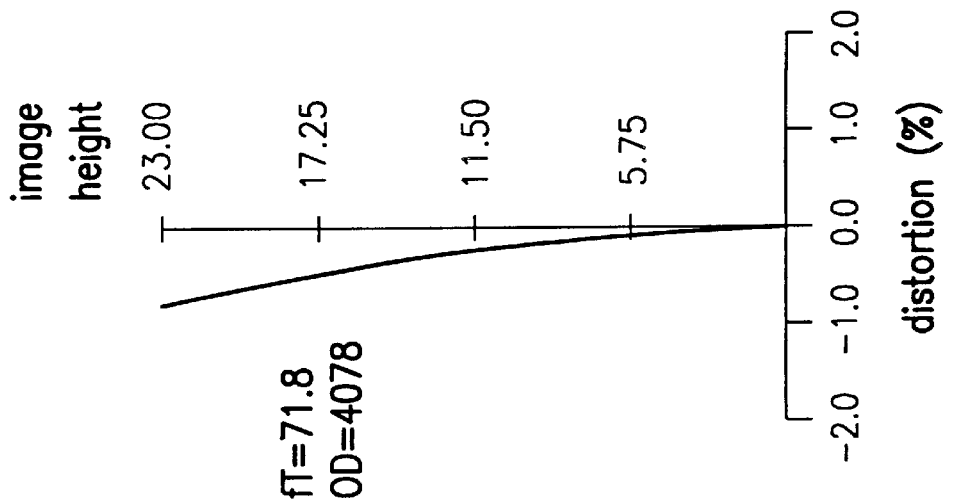
FIG. 5c is a diagram illustrating the distortion for the lens shown in FIG. 3, in which the object distance is 4 meters on the telephoto side.
Figure 5B:
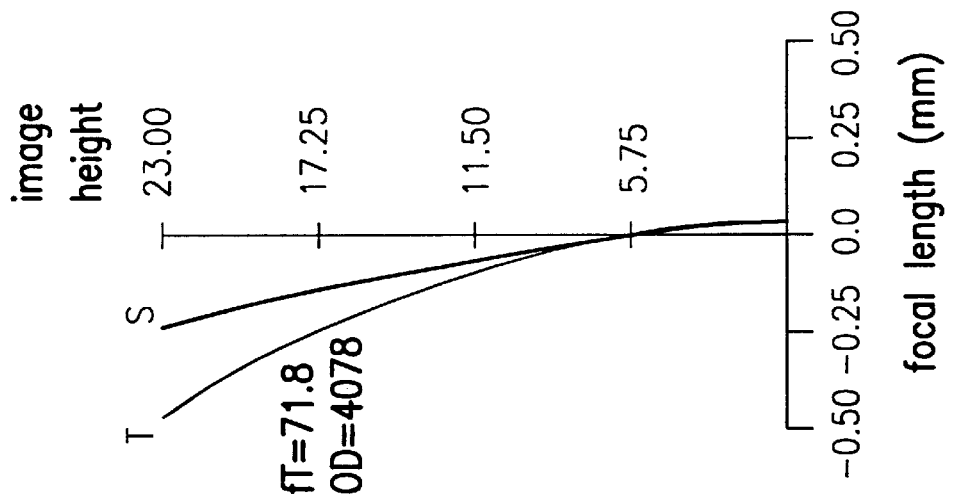
FIG. 5b is a diagram illustrating the astigmatism for the lens shown in FIG. 3, in which the object distance is 4 meters on the telephoto side.
Figure 5A:
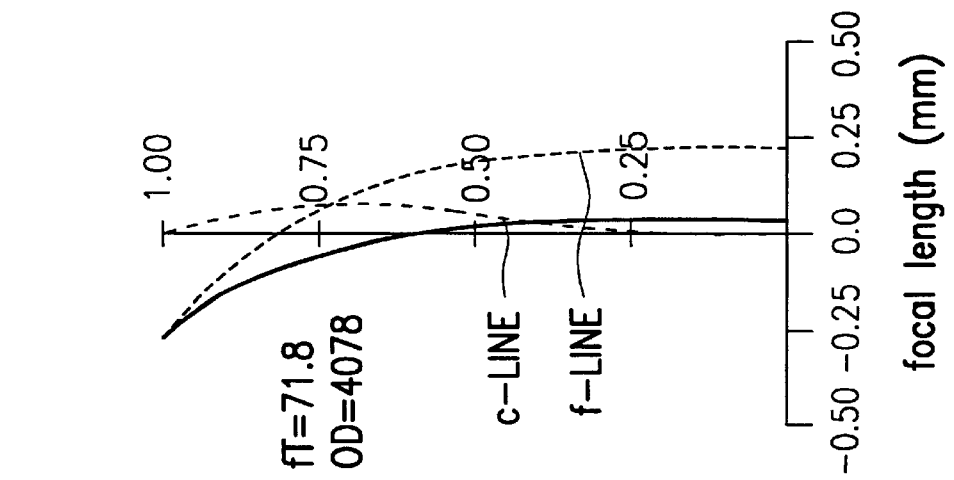
FIG. 5a is a diagram illustrating the spherical aberration for the lens shown in FIG. 3, in which the object distance is 4 meters on the telephoto side.
Figure 6C:
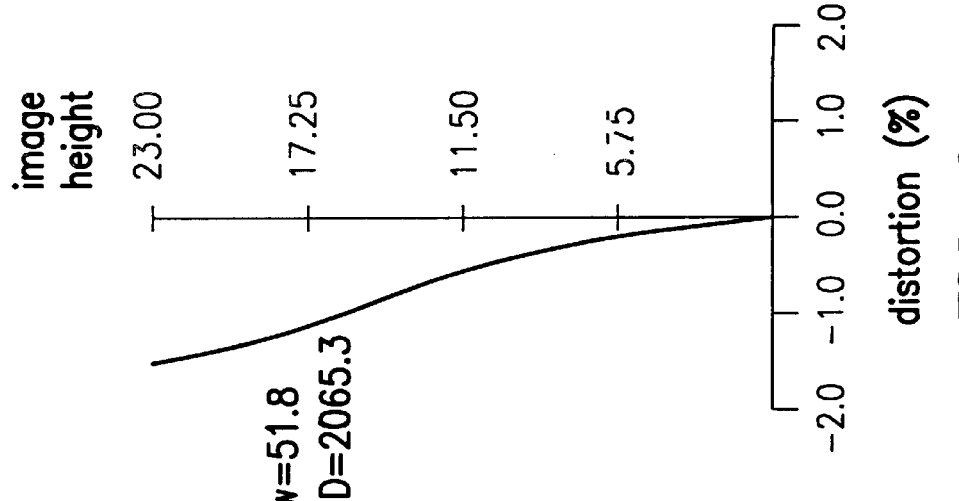
FIG. 6c is a diagram illustrating the distortion for the lens shown in FIG. 3, in which the object distance is 2 meters on the wide angle side.
Figure 6B:
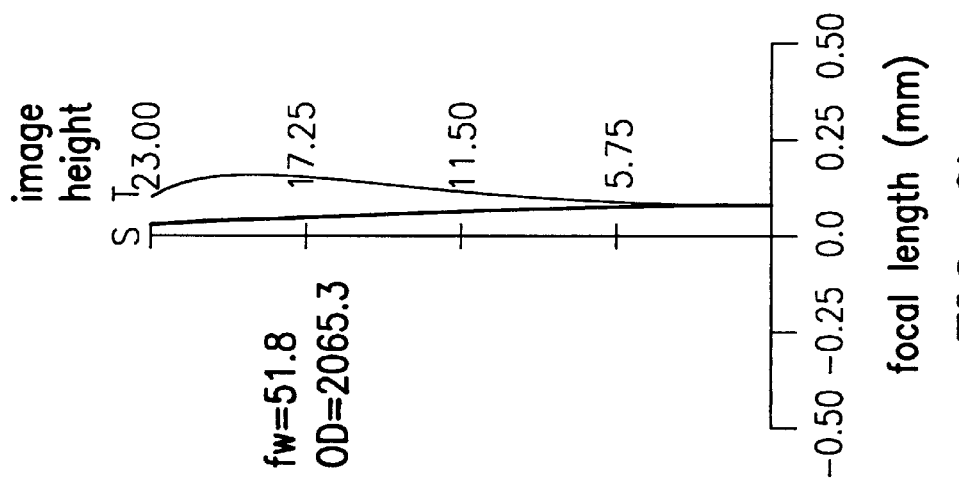
FIG. 6b is a diagram illustrating the astigmatism for the lens shown in FIG. 3, in which the object distance is 2 meters on the wide angle side.
Figure 6A:
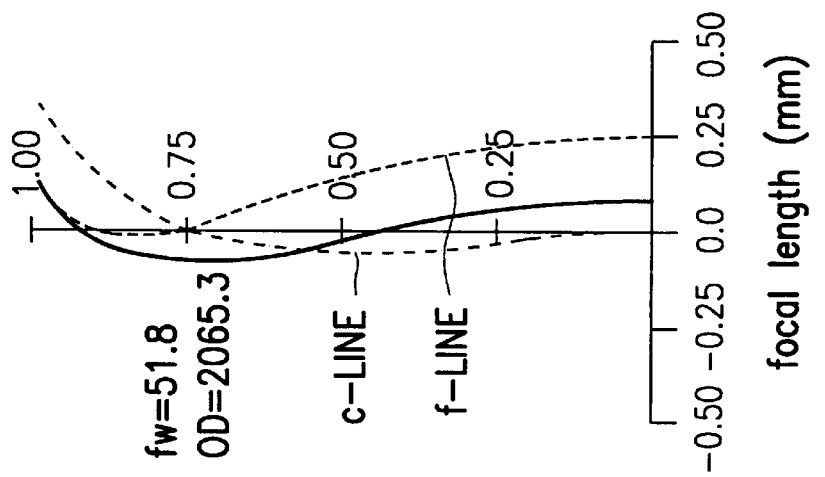
FIG. 6a is a diagram illustrating the spherical aberration for the lens shown in FIG. 3, in which the object distance is 2 meters on the wide angle side.
Figure 9C:
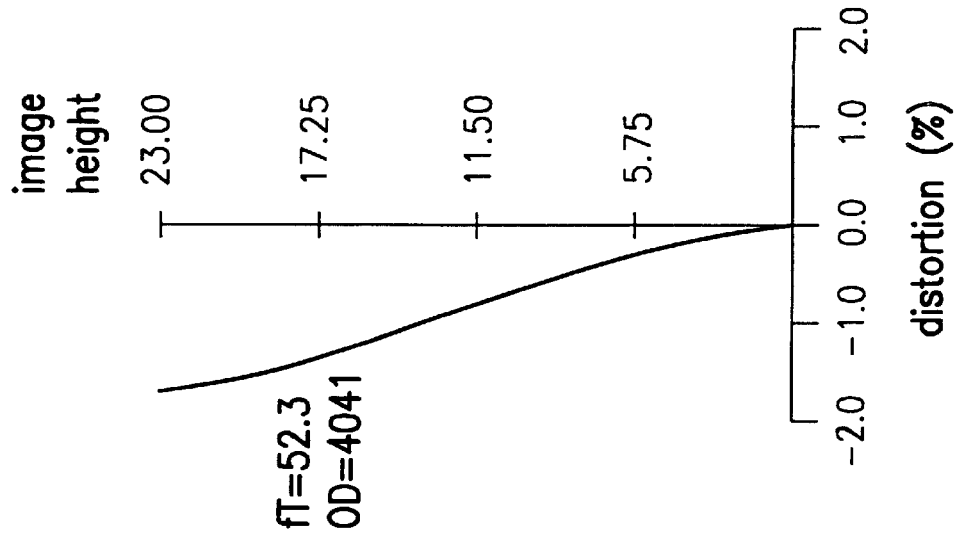
FIG. 9c is a diagram illustrating the distortion for the lens shown in FIG. 8, in which the object distance is 4 meters on the wide angle side.
Figure 9B:
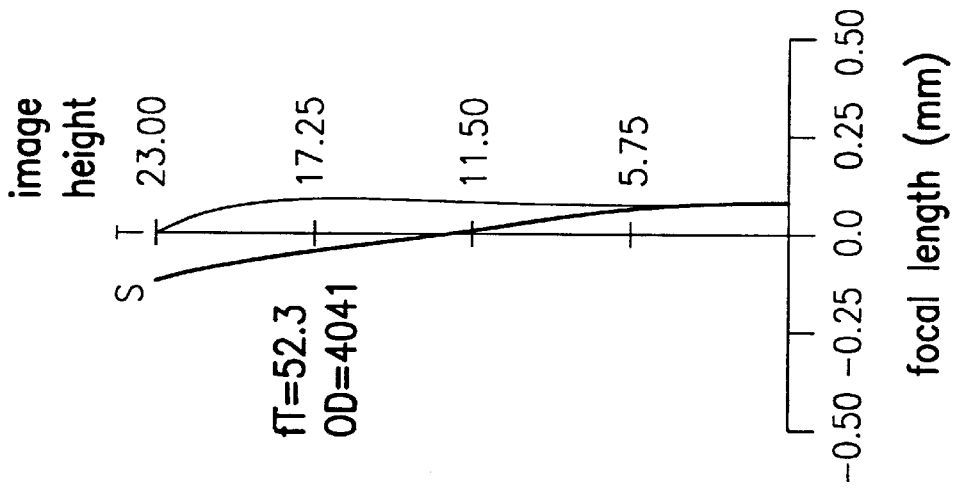
FIG. 9b is a diagram illustrating the astigmatism for the lens shown in FIG. 8, in which the object distance is 4 meters on the wide angle side.
Figure 9A:
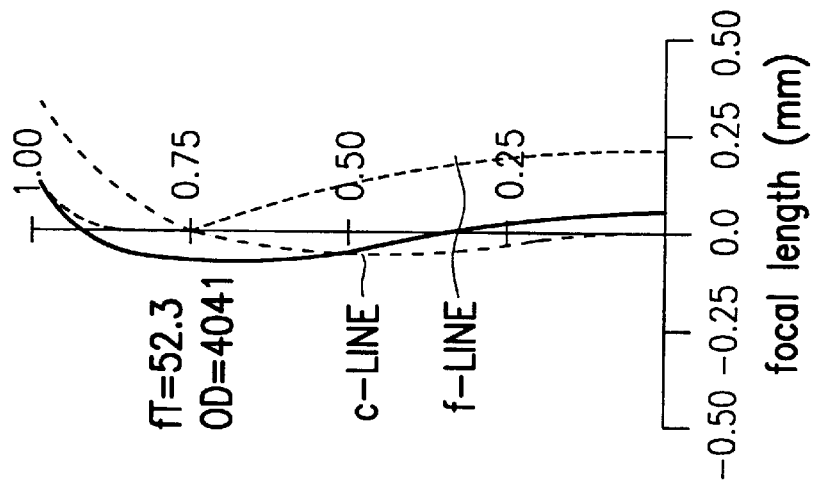
FIG. 9a is a diagram illustrating the spherical aberration for the lens shown in FIG. 8, in which the object distance is 4 meters on the wide angle side.
Figure 10C:
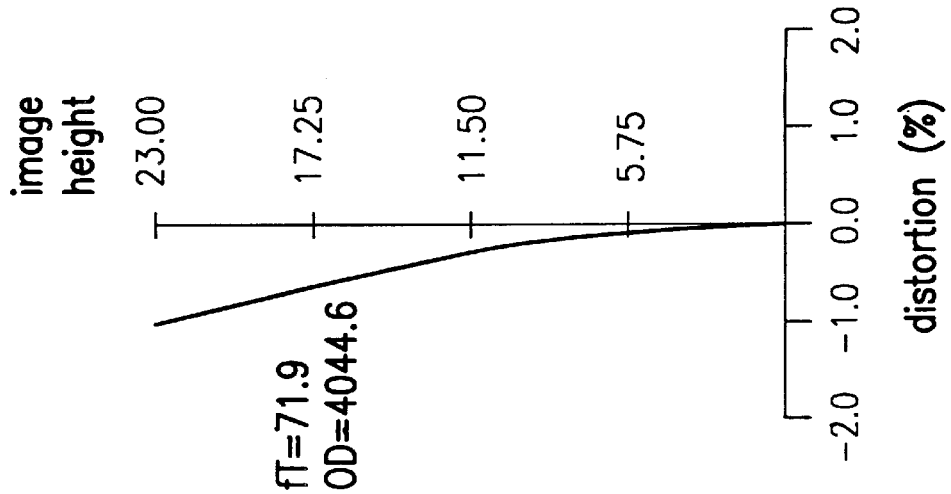
FIG. 10c is a diagram illustrating the distortion for the lens shown in FIG. 8, in which the object distance is 4 meters on the telephoto side.
Figure 10B:
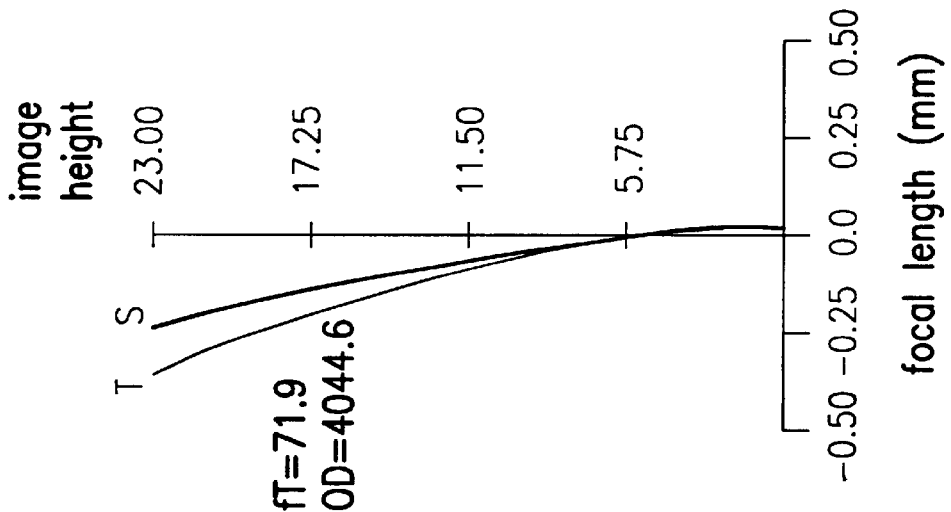
FIG. 10b is a diagram illustrating the astigmatism for the lens shown in FIG. 8, in which the object distance is 4 meters on the telephoto side.
Figure 10A:
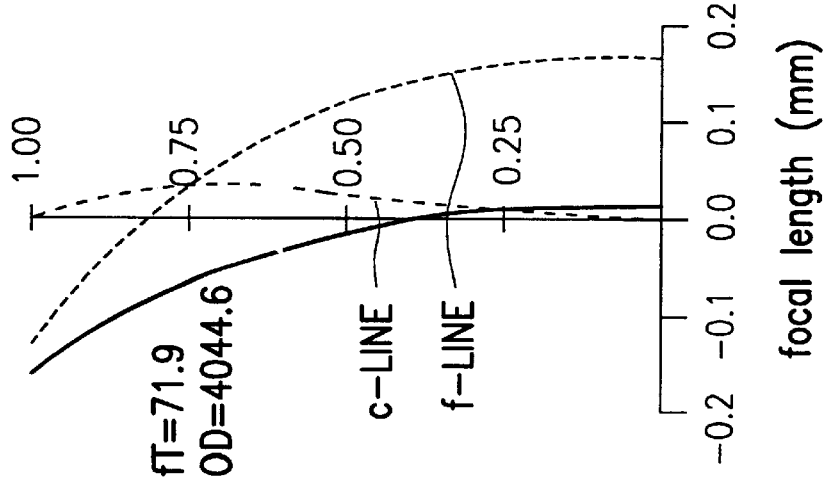
FIG. 10a is a diagram illustrating the spherical aberration for the lens shown in FIG. 8, in which the object distance is 4 meters on the telephoto side.
Figure 11C:
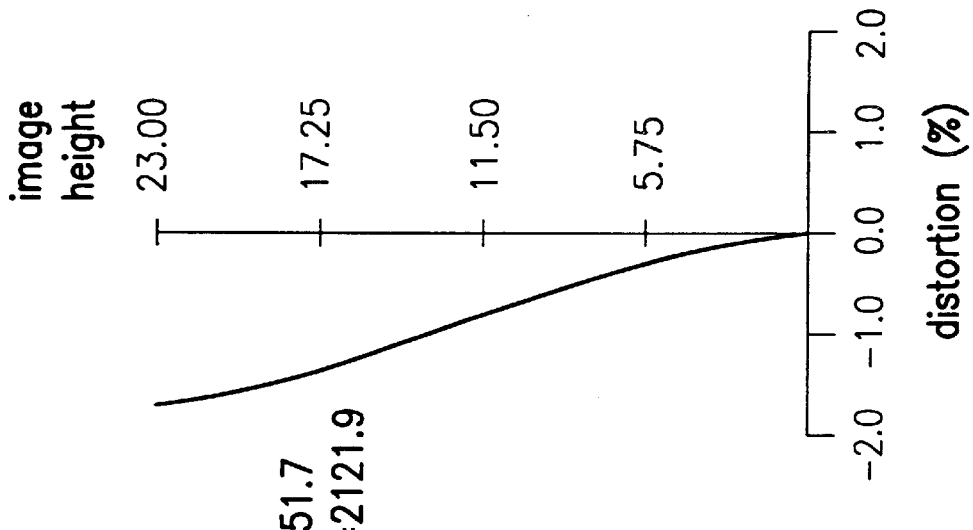
FIG. 11c is a diagram illustrating the distortion for the lens shown in FIG. 8, in which the object distance is 2 meters on the wide angle side.
Figure 11B:
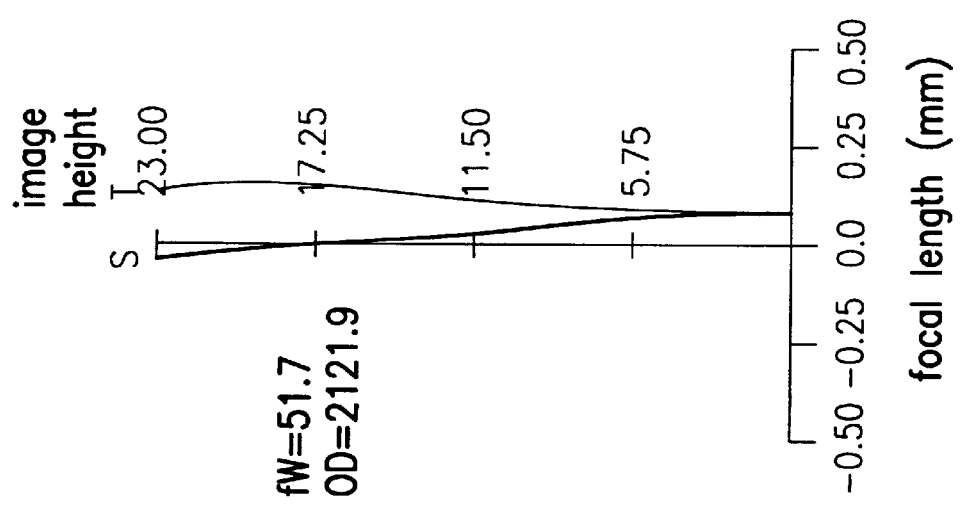
FIG. 11b is a diagram illustrating the astigmatism for the lens shown in FIG. 8, in which the object distance is 2 meters on the wide angle side.
Figure 11A:
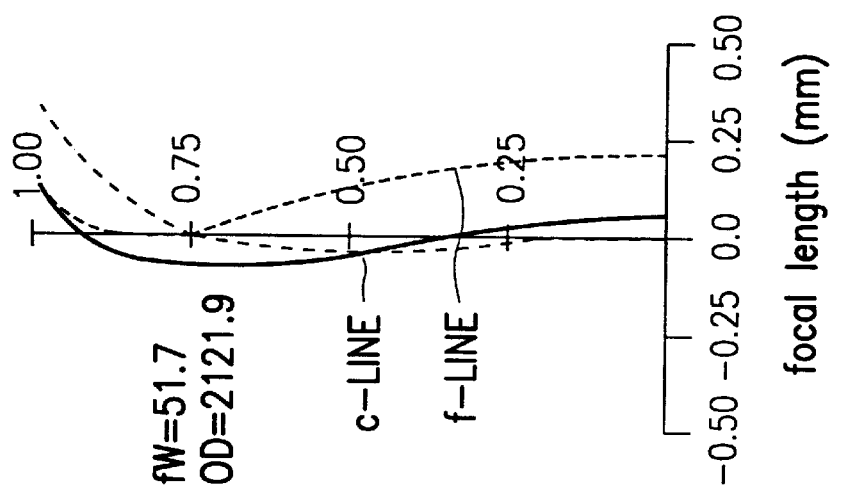
FIG. 11a is a diagram illustrating the spherical aberration for the lens shown in FIG. 8, in which the object distance is 2 meters on the wide angle side.

FIGS. 4a to 4c illustrate the spherical aberration, the astigmatism and the distortion for the zoom lens of the first embodiment, in which the object distance is 4 meters on the wide-angle side. FIGS. 5a to 5c illustrate the spherical aberration, the astigmatism and the distortion for the zoom lens of the first embodiment, in which the object distance is 4 meters on the telephoto side. FIGS. 6a to 6c illustrate the spherical aberration, the astigmatism and the distortion for the zoom lens of the first embodiment in which the object distance is 2 meters on the wide-angle side. FIGS. 7a to 7c illustrate the spherical aberration, the astigmatism and the distortion for the zoom lens of the first embodiment in which the object distance is 2 meters on the telephoto side. The drawings indicate that the spherical aberration is within 0.25 mm, the astigmatism is within 0.5 mm and the distortion is below 2% for the projection zoom lens according to this invention. FIGS. 9a to 9c illustrate the spherical aberration, the astigmatism and the distortion for the zoom lens of the second embodiment, in which the object distance is 4 meters on the wide-angle side. FIGS. 10a to 10c illustrate the spherical aberration, the astigmatism and the distortion for the zoom lens of the second embodiment, in which the object distance is 4 meters on the telephoto side. FIGS. 11a to 11c illustrate the spherical aberration, the astigmatism and the distortion for the zoom lens of the second embodiment, in which the object distance is 2 meters on the wide-angle side. FIGS. 12a to 12c illustrate the spherical aberration, the astigmatism and the distortion for the zoom lens of the second embodiment, in which the object distance is 2 meters on the telephoto side. The drawings indicate that the spherical aberration is within 0.25 mm, the astigmatism is within 0.5 mm and the distortion is below 2% for the projection zoom lens according to this invention.

Furthermore, in FIGS. 4a, 5a, 6a, 7a, 9a, 10a, 11a and 12a, c-line represents the wavelength of incident light of 656.3 nm, f-line represents the wavelength of incident light of 486.1 nm, fw represents the focal length of the wide-angle position, and OD represents the object distance, in which the unit of measurement is a millimeter.

The prior art, disclosed in Japanese Patent No. 6-130295, disclosed a back focal length nearly equal to that of this invention, but the image quality of the prior art is inferior to that of the present invention since its spherical aberration is only within 0.5 mm and its distortion can only be controlled under 5%.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives that have been discussed above and all equivalents thereto.

What is claimed is:

1. A projection zoom lens having a long back focal length comprising:

a front lens group including
      a first lens that is a convex lens,
      a second lens and a third lens, both of which are meniscus negative lens having a convex surface which is directed toward the object side,
      a fourth lens that is a meniscus positive lens having a surface which has a larger radius of curvature toward the image side; and a rear lens group including
      a fifth lens that is a plano-convex lens having a plane surface which is directed toward the object side,
      a sixth lens that is a biconvex lens,
      a seventh lens that is a meniscus negative lens, which forms a doublet with the sixth lens, having a surface which has a larger radius of curvature directed toward the image side,
      an eighth lens that is a meniscus negative lens having a surface which has a larger radius of curvature directed toward the object side,
      a ninth lens that is a plano-convex lens, having a plane surface which is directed toward the object side, and
      a tenth lens that is a biconvex lens;

wherein the front lens group and the rear lens group must conform to the following conditions:

$$1.2 \leq \frac{|f_A|}{f_W} \leq 1.5$$

$$V_3 \cdot N_3 \geq 90$$

$$V_6 - V_7 > 30$$

$$\frac{|f_A + f_B|}{f_B} \leq 0.2$$

where, $f_A$ is the focal length of the front lens group, $f_B$ is the focal length of the rear lens group, $f_w$ is the focal length of the projection zoom lens at a wide-angle side, $N_3$ is the refractive index of the third lens, $V_3$ is the Abbe number of the third lens, $V_6$ is the Abbe number of the sixth lens, and $V_7$ is the Abbe number of the seventh lens.

2. The projection zoom lens as claimed in claim 1 wherein the first lens is a biconvex lens.

3. The projection zoom lens as claimed in claim 1 wherein the fifth lens is a biconvex lens having a surface that has a larger radius of curvature directed toward the object side.

4. The projection zoom lens as claimed in claim 1 wherein the ninth lens is a biconvex lens.

5. The projection zoom lens as claimed in claim 1 wherein the seventh lens is a plano-convex lens having a plane surface that is directed toward the image side.

6. The projection zoom lens as claimed in claim 1 wherein the eighth lens is a meniscus positive lens having a surface that has a larger radius of curvature directed toward the object side.

* * * * *